(12) United States Patent
Yun et al.

(10) Patent No.: US 9,116,268 B2
(45) Date of Patent: Aug. 25, 2015

(54) BACKLIGHT UNIT AND LIQUID CRYSTAL DISPLAY DEVICE INCLUDING THE SAME

(71) Applicant: LG DISPLAY CO., LTD., Seoul (KR)

(72) Inventors: Hye-In Yun, Yangsan-si (KR); Koo-Hwa Lee, Daegu (KR); Sang-Chul Ryu, Gumi-si (KR); Jun-Young Park, Jinhae-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/094,183

(22) Filed: Dec. 2, 2013

(65) Prior Publication Data

US 2014/0176861 A1    Jun. 26, 2014

(30) Foreign Application Priority Data

Dec. 26, 2012 (KR) .................. 10-2012-0153845

(51) Int. Cl.
*G02F 1/1335* (2006.01)
*F21V 8/00* (2006.01)

(52) U.S. Cl.
CPC ............ *G02B 6/0031* (2013.01); *G02B 6/0068* (2013.01); *G02B 6/0073* (2013.01)

(58) Field of Classification Search
CPC .................. G02F 1/133603; G02B 6/0073
USPC ...................... 349/62, 65; 362/612
See application file for complete search history.

(56) References Cited

U.S. PATENT DOCUMENTS

2012/0026424 A1*  2/2012  Youk et al. ............ 349/62
2013/0258251 A1*  10/2013  Lee et al. ............ 349/69

* cited by examiner

*Primary Examiner* — Thanh-Nhan P Nguyen
(74) *Attorney, Agent, or Firm* — Birch, Stewart, Kolasch & Birch, LLP (57) ABSTRACT

A backlight unit according to an embodiment includes: a light guide plate; a light emitting diode (LED) assembly supplying a light to the light guide plate; and a reflecting plate under the light guide plate, wherein the LED assembly includes: an LED printed circuit board (PCB) disposed at a side of the light guide plate; a plurality of LED chips over the LED PCB, the plurality of LED chips spaced apart from each other; a plurality of first lead frames electrically connecting the LED PCB and the plurality of LED chips; and an LED housing surrounding the plurality of LED chips and the plurality of first lead frames.

14 Claims, 10 Drawing Sheets

(No hot spot)

BACKLIGHT UNIT AND LIQUID CRYSTAL DISPLAY DEVICE INCLUDING THE SAME

CROSS REFERENCE TO RELATED APPLICATIONS

The present application claims the benefit of priority of Korean Patent Application No. 10-2012-0153845 filed in the Republic of Korea on Dec. 26, 2012, which is hereby incorporated by reference in its entirety.

BACKGROUND OF THE INVENTION

1. Field of the Disclosure

The present disclosure relates to a liquid crystal display device. The present disclosure also relates to a backlight unit where a thickness is reduced by changing the number and the structure of housings and a liquid crystal display device including the backlight unit.

2. Discussion of the Related Art

Since the liquid crystal display (LCD) device has advantages such as high contrast ratio and superiority in displaying a moving image, the LCD device has been used for a monitor of a computer or a television. The LCD device displays an image by using optical anisotropy and polarization properties of liquid crystal molecules.

The LCD device includes two substrates having a pixel electrode and a common electrode, respectively, and a liquid crystal layer between the two substrates. In the LCD device, an alignment direction of liquid crystal molecules of the liquid crystal layer is determined according to an electric field between the pixel electrode and the common electrode and transmittance difference is obtained in the liquid crystal layer by the alignment direction.

However, since the LCD device is a non-emissive type display device, an additional light source is required to display an image by transmittance difference. Accordingly, a backlight unit including a light source is disposed under the liquid crystal panel. For example, one of a cold cathode fluorescent lamp (CCFL), an external electrode fluorescent lamp (EEFL) and a light emitting diode (LED) may be used as the light source of the backlight unit. Among various light sources, the LED has been widely used as the light source for its various features such as a small size, a low power consumption and a high reliability.

Figure 1A:
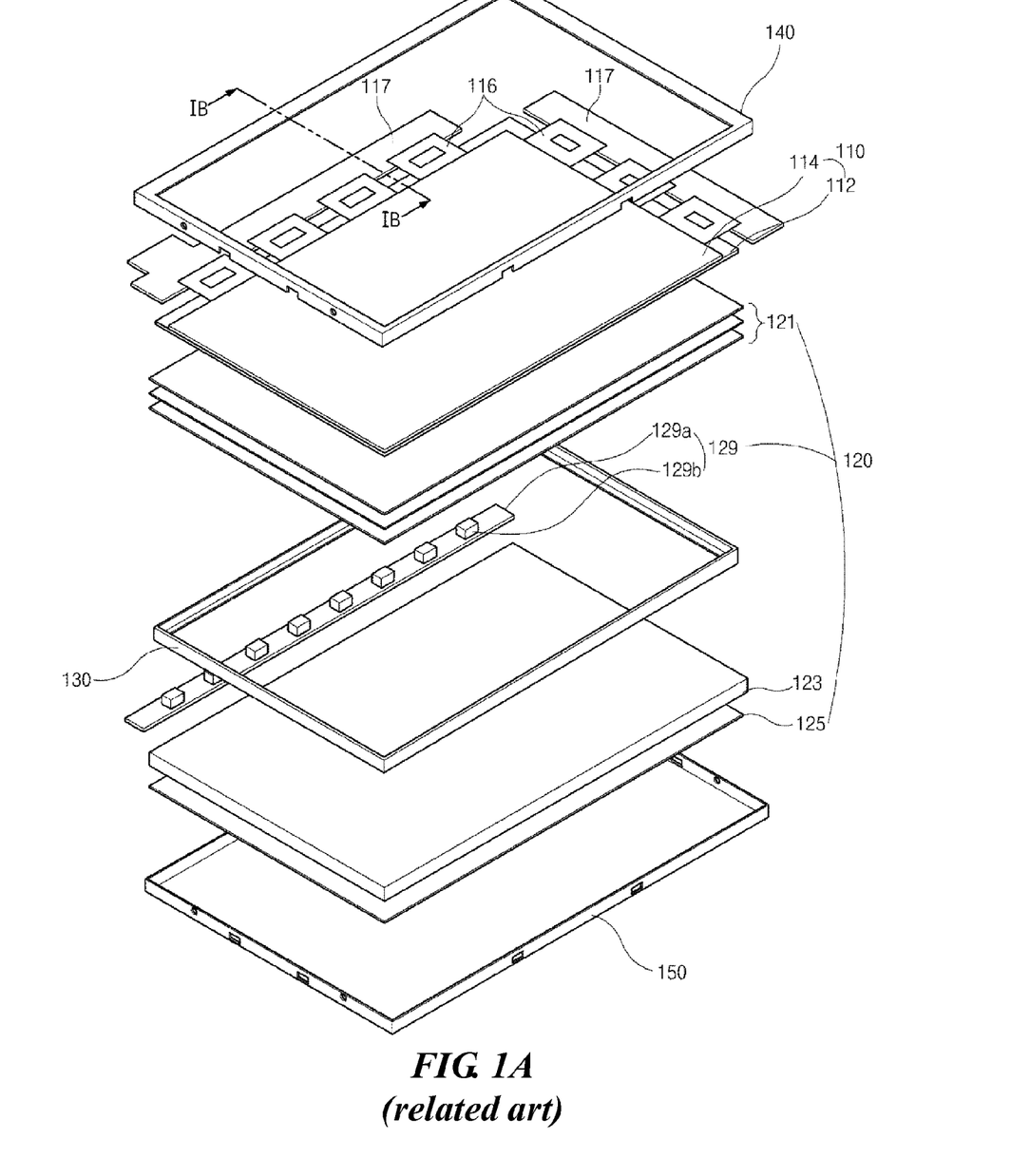
FIG. 1A is an exploded perspective view showing a liquid crystal display device according to the related art.
Figure 1B:
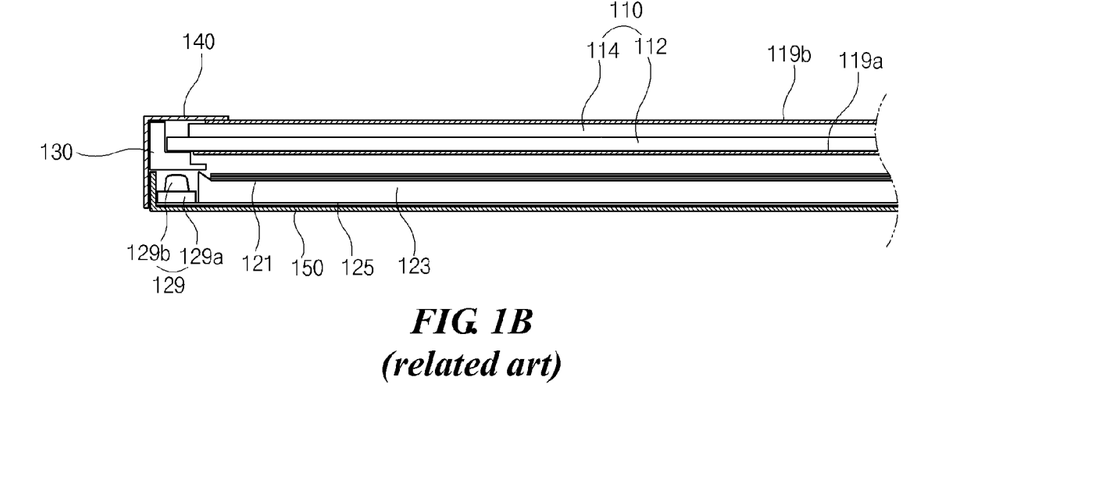
FIG. 1B is a cross-sectional view taken along a ling IB-IB of FIG. 1A.

FIG. 1A is an exploded perspective view showing a liquid crystal display device according to the related art, and FIG. 1B is a cross-sectional view taken along a ling IB-IB of FIG. 1A.

In FIGS. 1A and 1B, a liquid crystal display (LCD) device includes a liquid crystal panel 110, a backlight unit 120, a main frame 130, a top frame 140 and a bottom frame 150. The liquid crystal panel 110 for displaying an image includes first and second substrates 112 and 114 facing and spaced apart from each other and a liquid crystal layer (not shown) between the first and second substrates 112 and 114. First and second polarizing plates 19a and 19b are formed on outer surfaces of the first and second substrates 112 and 114, respectively.

The backlight unit 120 for supplying a light is disposed under the liquid crystal panel 110. The backlight unit 120 includes a light emitting diode (LED) assembly 129 along at least one side of the main frame 130, a reflecting plate 125 of a white color or a silver color on the bottom frame 150, a light guide plate 123 on the reflecting plate 125 and an optical sheet 121 on the light guide plate 123. The LED assembly 129 is disposed at side of the light guide plate 123 and includes an LED printed circuit board (PCB) 129a and a plurality of LED packages 129b mounted on the LED PCB 129a.

The main frame 130 having a rectangular ring shape wraps side surfaces of the liquid crystal panel 110 and the backlight unit 120. In addition, the top frame 140 covers front edge portions of the liquid crystal panel 110, and the bottom frame 150 covers a bottom surface of the backlight unit 120. Accordingly, the liquid crystal panel 110 and the backlight unit 120 are modularized by combining the top frame 140 and the bottom frame 150 with the main frame 130.

Figure 2A:
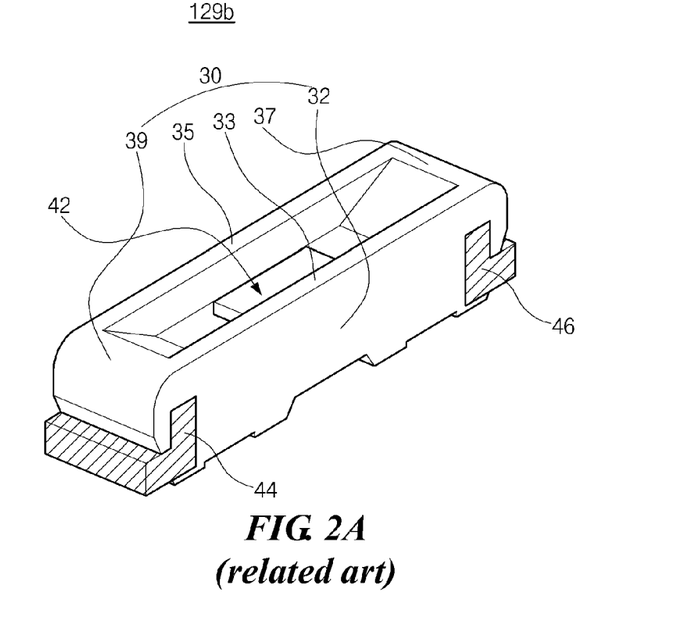
FIG. 2A is a perspective view showing an LED package according to the related art.
Figure 2B:
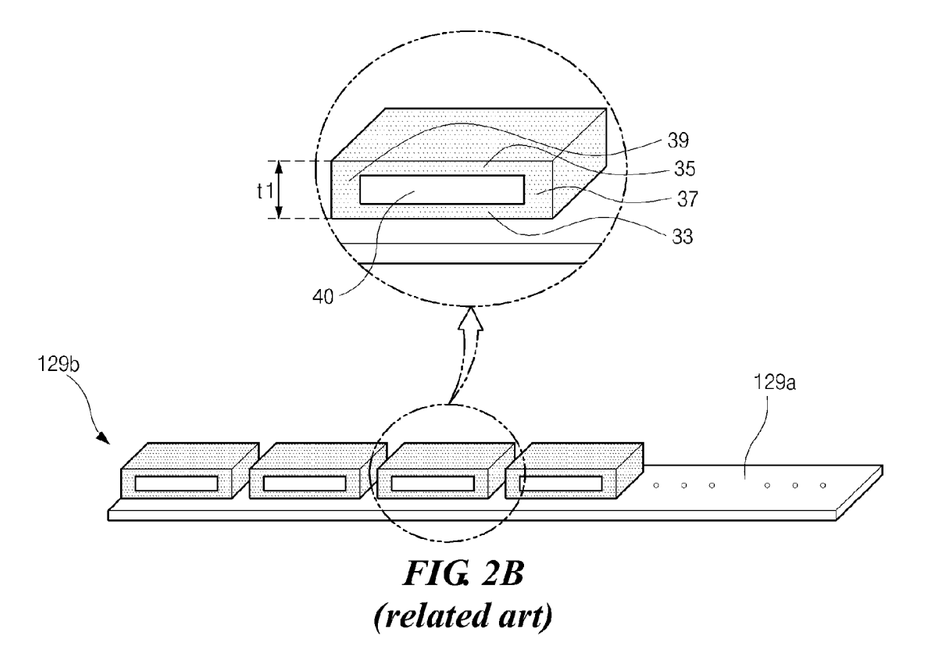
FIG. 2B is a perspective view showing an LED assembly according to the related art.

FIG. 2A is a perspective view showing an LED package according to the related art and FIG. 2B is a perspective view showing an LED assembly according to the related art.

In FIG. 2A, an LED package 129b includes a case 30 having a body 32 and first to fourth sidewalls 33, 35, 37 and 39 protruding from the body 32, an LED chip 42 disposed in a space surrounded by the first to fourth sidewalls 33, 35, 37 and 39, and first and second electrode leads 44 and 46 exposed outside the case 30. Although not shown, the first and second electrode leads 44 and 46 are connected to the LED chip 42 through a wire, and a fluorescent material is formed in the space surrounded by the first to fourth sidewalls 33, 35, 37 and 39 to cover the LED chip 42.

In FIG. 2B, the LED package 129b is mounted on an LED PCB 129a such that the first sidewall 33 of the LED package 129b is attached to a top surface of the LED PCB 129a. Accordingly, an emitting surface 40 facing the LED chip 42 is disposed to be perpendicular to the top surface of the LED PCB 129a, and the LED package 129b emits a light along a direction parallel to the top surface of the LED PCB 129a. The LED assembly 129 where the light is emitted from the LED package 129b along a direction parallel to a top surface of the LED PCB 129a may be referred to as a side-view type.

As the LCD device has been widely used for a notebook and a smartbook, a demand for reduction in thickness of the backlight unit 120 of the LCD device increases. Since each of the reflecting plate 125 and the optical sheet 121 has a relatively small thickness, a thickness of the backlight unit 120 may be determined by a thickness of the LED assembly 129 and a thickness of the light guide plate 123.

Although a research for reducing a thickness of the LED package 129b of the LED assembly 129 has been performed, there exists a limit to reduction of a thickness of the LED package 129b. A first thickness t1 of the LED package 129b is a sum of a thickness of the first sidewall 33, a thickness of the emitting surface 40 and a thickness of the second sidewall 35. Since the first and second sidewalls 33 and 35 should constitute the case 30, there is a limit to reduction of the thickness of the first and second sidewalls 33 and 35. In addition, when the thickness of the emitting surface 40 is reduced, a luminous flux of the LED package 129b is also reduced. Since the LED package 129b has a minimum luminous flux, there is a limit to reduction of the thickness of the emitting surface 40. Accordingly, there exists a limit to reduction of a thickness of the backlight unit 120 due to reduction of the thickness of the LED package 129b.

Further, since the LED package for a top-view type LED assembly is used for the side-view type LED assembly 129 by rotating the case 30, the LED package 129b includes the unnecessary first sidewall 33. As a result, the first sidewall 33 causes increase of the thickness of the backlight unit 120.

Figure 3A:
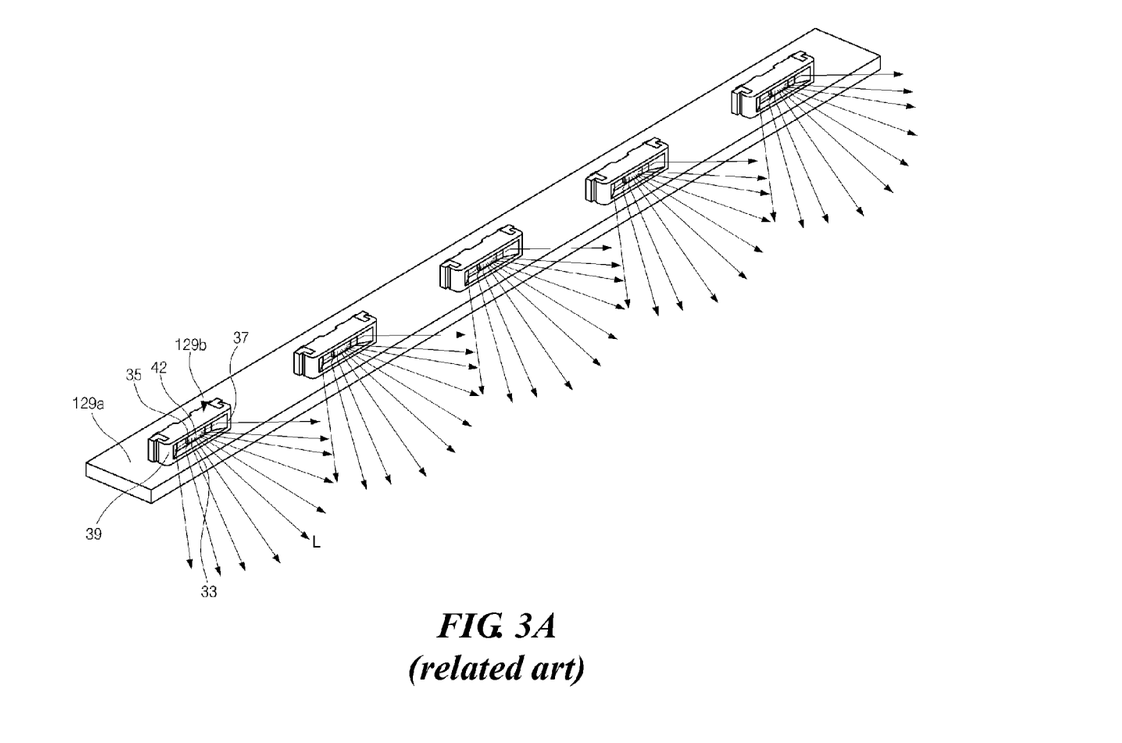
FIG. 3A is a perspective view showing a direction of a light from an LED assembly according to the related art.
Figure 3B:
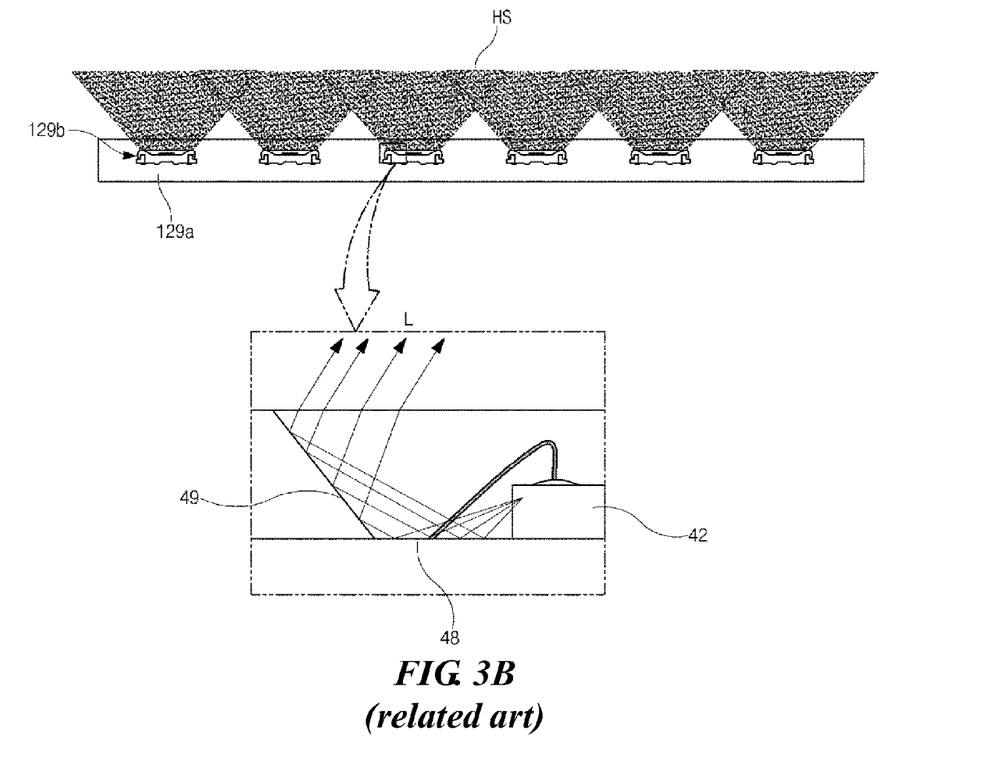
FIG. 3B is a plan view showing a distribution and a path of a light from an LED assembly according to the related art.

FIG. 3A is a perspective view showing a direction of a light from an LED assembly according to the related art and FIG. 3B is a plan view showing a distribution and a path of a light from an LED assembly according to the related art.

In FIGS. 3A and 3B, since the LED chip 42 is disposed in the case 30 to face an incident surface of the light guide plate 123 (of FIG. 1), the first to fourth sidewalls 33, 35, 37 and 39 are required for effectively reflecting a light L from the LED chip 42 toward the incident surface of the light guide plate 123 by a bottom surface 48 and a side surface 49. Since the case 30 including the first to fourth sidewalls 33, 35, 37 and 39 is fabricated through a molding method, fabrication process for the LED package 129b is complicated and fabrication cost for the LED package 129b increases.

Further, since the light L is radially emitted from the LED package 129b, the LED package 129b is disposed to be separated from the light guide plate 123 by a relatively short distance. As a result, the light from adjacent two LED packages 129b overlap to form a hot spot HS, and the hot spot HS degrades uniformity in luminance of the backlight unit 120.

SUMMARY OF THE INVENTION

Accordingly, embodiments of the present invention are directed to a backlight unit and a liquid crystal display device including the backlight unit that substantially obviate one or more of the problems due to limitations and disadvantages of the related art.

An object of the present disclosure is to provide a backlight unit where a thickness is reduced and an optical efficiency is improved and a liquid crystal display device including the backlight unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, as embodied and broadly described herein, there is provided a backlight unit including: a light guide plate; a light emitting diode (LED) assembly supplying a light to the light guide plate; and a reflecting plate under the light guide plate, wherein the LED assembly includes: an LED printed circuit board (PCB) disposed at a side of the light guide plate; a plurality of LED chips over the LED PCB, the plurality of LED chips spaced apart from each other; a plurality of first lead frames electrically connecting the LED PCB and the plurality of LED chips; and an LED housing surrounding the plurality of LED chips and the plurality of first lead frames.

In another aspect, there is provided a liquid crystal display device including: a liquid crystal panel displaying an image; a backlight unit supplying a light to the liquid crystal panel, wherein the backlight unit includes a light guide plate, a light emitting diode (LED) assembly supplying a light to the light guide plate and a reflecting plate under the light guide plate, wherein the LED assembly includes: an LED printed circuit board (PCB) disposed at a side of the light guide plate; a plurality of LED chips over the LED PCB, the plurality of LED chips spaced apart from each other; a plurality of first lead frames electrically connecting the LED PCB and the plurality of LED chips; and an LED housing surrounding the plurality of LED chips and the plurality of first lead frames; a main frame wrapping the liquid crystal panel and the backlight unit; a top frame covering front edge portions of the liquid crystal panel; and a bottom frame covering a bottom surface of the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 4:
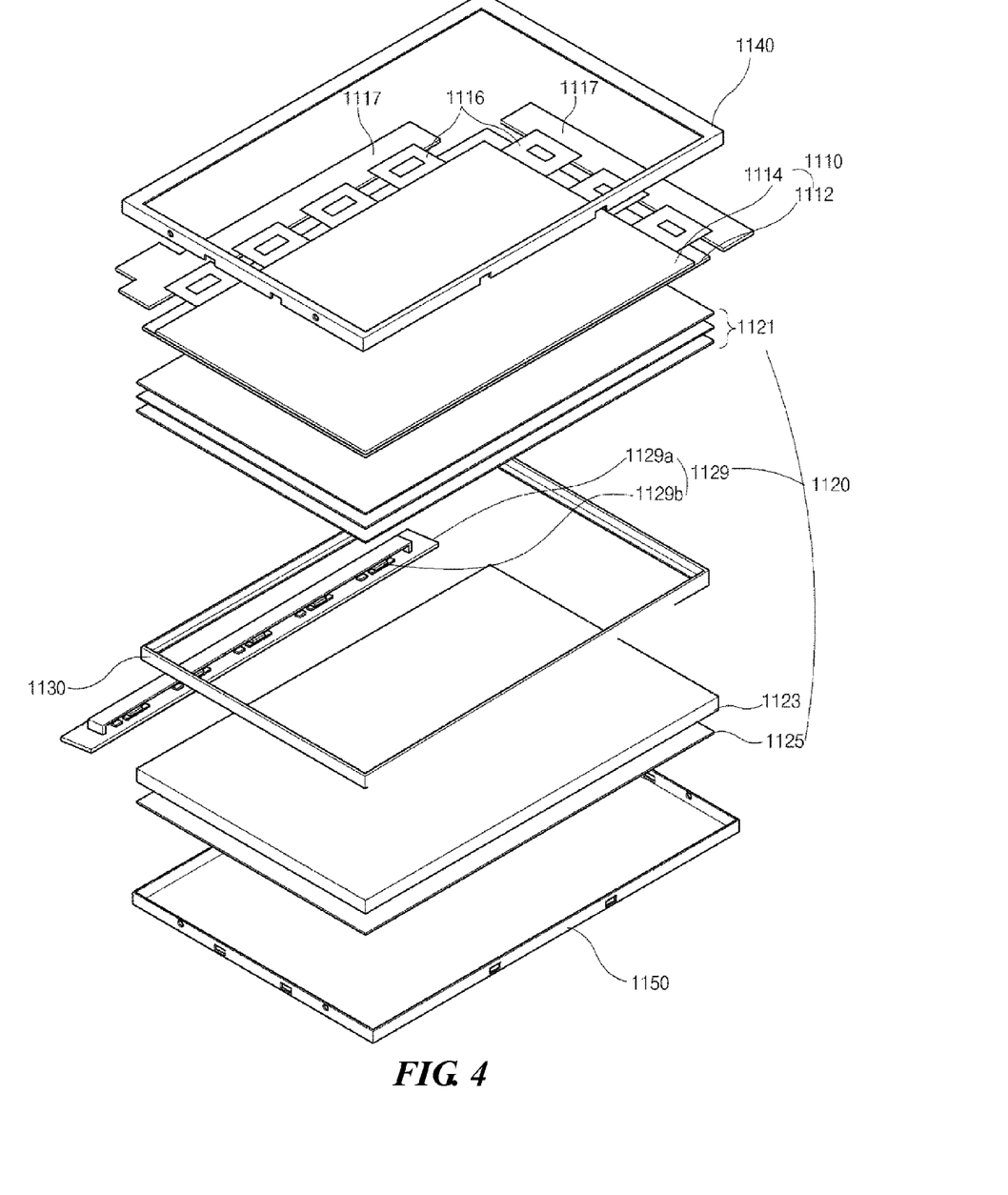
FIG. 4 is an exploded perspective view showing a liquid crystal display device according to a first embodiment of the present invention.

FIG. 4 is an exploded perspective view showing a liquid crystal display device according to a first embodiment of the present invention.

In FIG. 4, a liquid crystal display (LCD) device includes a liquid crystal panel 1110, a backlight unit 1120, a main frame 1130, a top frame 1140 and a bottom frame 1150. The liquid crystal panel 1110 for displaying an image includes first and second substrates 1112 and 1114 and a liquid crystal layer (not shown) between the first and second substrates 1112 and 1114.

Although not shown, when the LCD device has an active matrix type, a gate line and a data line are formed on an inner surface of the first substrate 1112, which is referred to as an array substrate or a lower substrate. The gate line and the data line cross each other to define a pixel region, and a thin film transistor (TFT) is connected to the gate line and the data line. A pixel electrode connected to the TFT is formed in the pixel region.

Although not shown, a black matrix corresponding to the gate line, the data line and the TFT is formed on an inner surface of the second substrate 1114, which is referred to as a color filter substrate or an upper substrate. A color filter layer including red, green and blue color filters is formed on the black matrix and a common electrode is formed on the color filter layer.

When a gate signal is supplied to the gate line and the TFT connected to the gate line is turned on by the gate signal, a data signal is applied to the pixel electrode through the TFT. In addition, a common signal is applied to the common electrode. As a result, an electric field is generated between the pixel electrode and the common electrode, and liquid crystal molecules of the liquid crystal layer are realigned by the electric field, thereby an image displayed.

Gate and data printed circuit boards (PCBs) 1117 are connected to the liquid crystal panel 1110 along at least one side through a connection means 1116 such as a flexible printed circuit (FPC) or a tape carrier package (TCP). The gate and data PCBs 1117 may receive various signals such as an image signal, a horizontal synchronization signal, a vertical synchronization signal, a data enable signal and a clock signal from an external circuit such as a graphic card or a television system. The gate and data PCBs 1117 are folded to contact the main frame 1130 or the bottom frame 1150 during a modularization process.

A first orientation film (not shown) is formed between the first substrate 1112 and the liquid crystal layer, and a second orientation film (not shown) is formed between the second substrate 1114 and the liquid crystal layer. The first and second orientation films determine an initial alignment direction of the liquid crystal molecules. In addition, a seal pattern (not shown) is formed between the first and second substrates 1112 and 1114 along an edge portion. The seal pattern prevents a leakage of the liquid crystal molecules. Further, first and second polarizing plates (not shown) are formed on outer surfaces of the first and second substrates 1112 and 1114, respectively. The first and second polarizing plates selectively transmit a polarized light.

The backlight unit 1120 for supplying a light is disposed under the liquid crystal panel 1110. The backlight unit 1120 may include a light guide plate 1123, a reflecting plate 1125, an optical sheet 1121 and a light emitting diode (LED) assembly 129. The light guide plate 1123 is disposed under the liquid crystal panel 1110 and the optical sheet 1121 is disposed between the liquid crystal panel 1110 and the light guide plate 1123.

The LED assembly 1129 is disposed at a side of the light guide plate 1123 and supplies a light to the light guide plate 1123. The light emitted from the LED assembly 1129 enters the light guide plate 1123 and then is uniformly diffused in the light guide plate 1123 by total reflection. The light emitted from a top surface of the light guide plate 1123 passes through the optical sheet 1121 to become a uniform plane light and then is supplied to the liquid crystal panel 1110.

For the purpose of supplying a uniform plane light, a pattern having a predetermined shape may be formed on a bottom surface of the light guide plate 1123. The pattern may have one of an elliptical shape, a polygonal shape and a hologram pattern and may be formed through one of a printing method and a molding method.

The reflecting plate 1125 reflects the light emitted from the bottom surface of the light guide plate 1123 to increase a optical efficiency. The optical sheet 1121 may include at least one diffusion sheet and at least one collimating sheet.

The LED assembly 1129 having a side-view type includes an LED printed circuit board (PCB) 1129*a* and a plurality of LED chips 1129*b* over the LED PCB 1129*a*. The LED PCB 1129*a* is disposed parallel to the light guide plate 1123. The plurality of LED chips 1129*b* are mounted on the LED PCB 1129*a*, and each of the plurality of LED chips 1129*b* emits a light from a side surface thereof. For example, the plurality of LED chips 1129*b* may be disposed to be separated from each other by an equal distance.

The main frame 1130 having a rectangular ring shape wraps side surfaces of the liquid crystal panel 1110 and the backlight unit 1120. In addition, the top frame 1140 covers front edge portions of the liquid crystal panel 1110, and the bottom frame 1150 covers a bottom surface of the backlight unit 1120. Accordingly, the liquid crystal panel 1110 and the backlight unit 1120 are modularized by combining the top frame 1140 and the bottom frame 1150 with the main frame 1130 to constitute the LCD device.

Figure 5A:
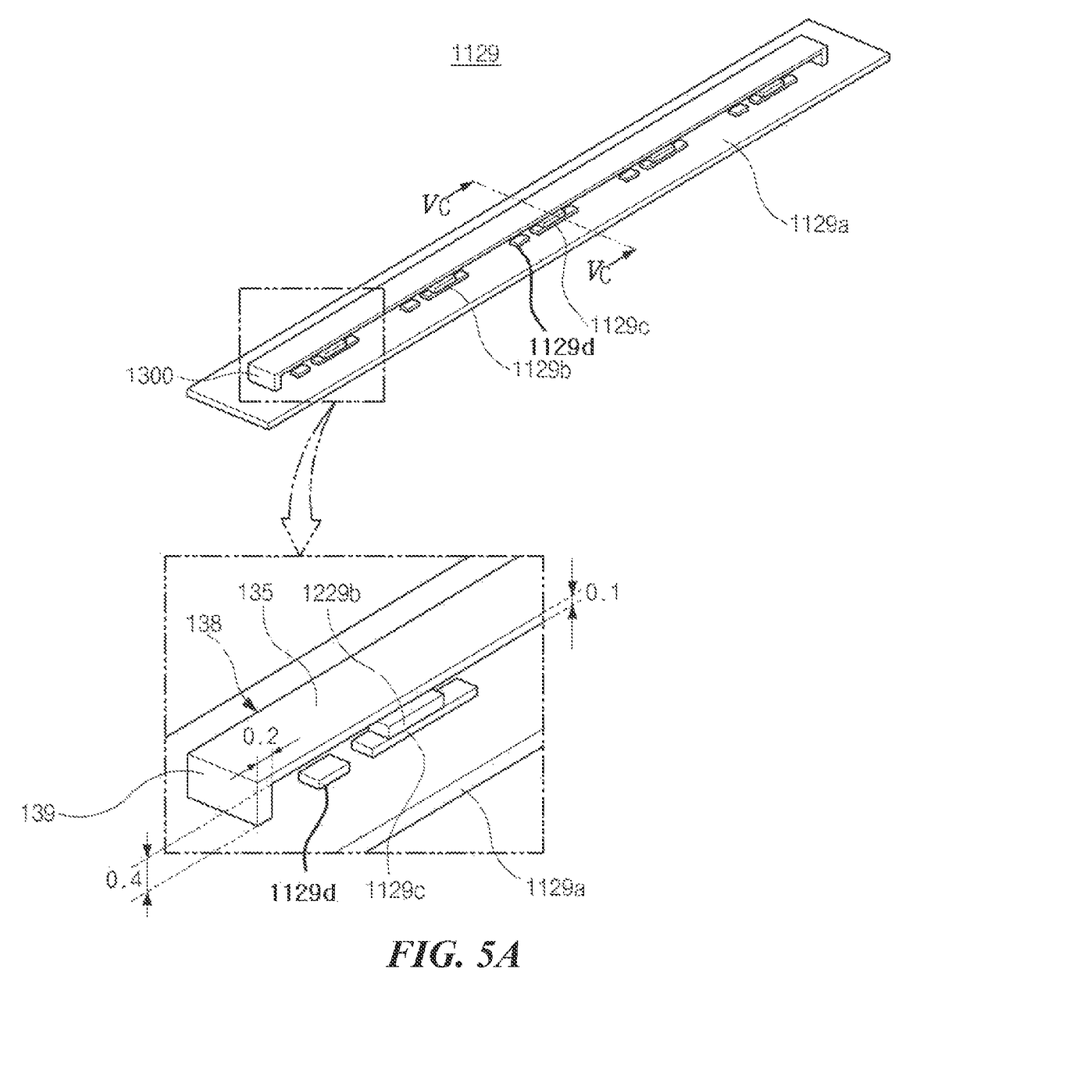
FIG. 5A is a perspective view showing an LED assembly for a liquid crystal display device according to a first embodiment of the present invention.
Figure 5B:
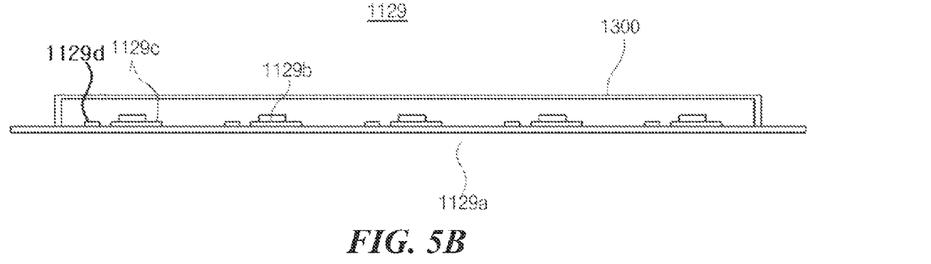
FIG. 5B is a front view showing an LED assembly for a liquid crystal display device according to a first embodiment of the present invention.
Figure 5C:
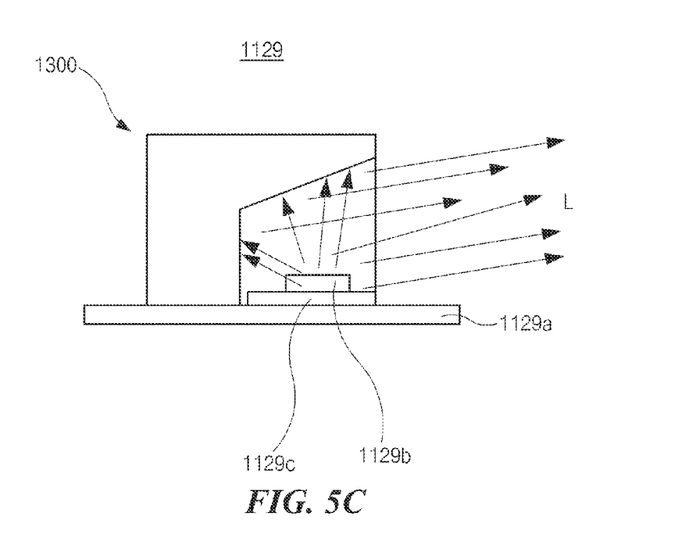
FIG. 5C is a cross-sectional view taken along a line VC-VC of FIG. 5A.
Figure 5D:
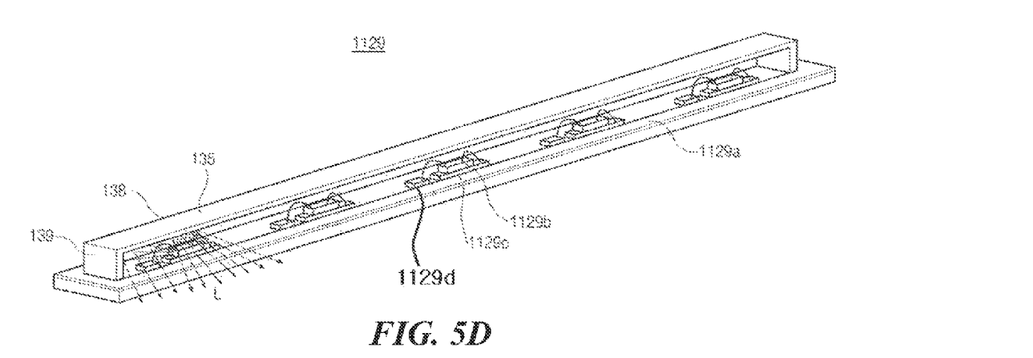
FIG. 5D is a perspective view showing a direction of a light from an LED assembly according to a first embodiment of the present invention.
Figure 5E:
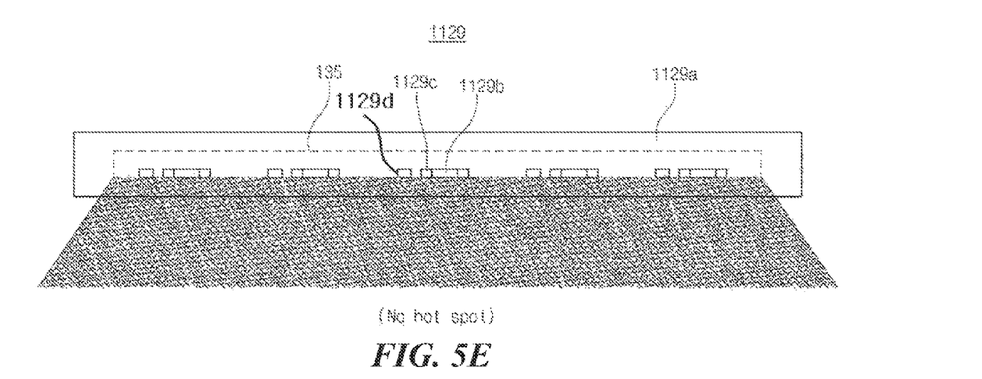
FIG. 5E is a plan view showing a distribution and a path of a light from an LED assembly according to a first embodiment of the present invention.

FIGS. 5A and 5B are perspective and front views, respectively, showing an LED assembly for a liquid crystal display device according to a first embodiment of the present invention, and FIG. 5C is a cross-sectional view taken along a line VC-VC of FIG. 5A. In addition, FIG. 5D is a perspective view showing a direction of a light from an LED assembly according to a first embodiment of the present invention and FIG. 5E is a plan view showing a distribution and a path of a light from an LED assembly according to a first embodiment of the present invention.

In FIGS. 5A and 5B, the LED assembly 1129 includes the LED PCB 1129*a*, the plurality of LED chips 1129*b* over the LED PCB 1129*a*, a plurality of first and second lead frames 1129*c* and 1129*d* electrically connecting the LED PCB 1129*a* and the plurality of LED chips 1129*b* and an LED housing 1300 surrounding the plurality of LED chips 1129*b* and the plurality of first and second lead frames 1129*c* and 1129*d*. The plurality of LED chips 1129*b* are formed on the plurality of first lead frames 1129*c*, respectively, and the plurality of first lead frames 1129*c* are formed on the LED PCB 1129*a*. Each of the first and second lead frames 1129*c* and 1129*d* has a plate shape. For the purpose of increasing heat radiation efficiency, the plurality of second lead frames 1129*d* may be formed adjacent to the plurality of first lead frames 1129*c*. For example, a width of each second lead frame 1129*d* may be equal to or smaller than a width of each first lead frame 1129*c*.

Each of the plurality of LED chips 1129*b* emits a light from a side surface thereof. Although not shown, a space surrounded by the LED housing 1300 is filled with a sealing means so that the plurality of LED chips 1129*b* is covered with the sealing means. The sealing means may include a fluorescent material and a resin.

The LED housing 1300 has a rectangular parallelepiped shape including a top surface 135, a larger side surface 138, two smaller side surfaces 139 and two open surfaces. In another embodiment, the LED housing 1300 may have a hemispherical shape including an open portion for emission. The two smaller side surfaces 139 are attached to the LED PCB 1129*a* to support right and left ends of the top surface 135, and the larger side surface 138 is attached to the LED PCB 1129*a* to support a rear end of the top surface 135. One open surface of the LED housing 1300 faces the LED PCB 1129*a* and the other open surface of the LED housing 1300 faces the light guide plate 1123 (of FIG. 4). The top surface 135 is attached to the two smaller side surfaces 139 and the larger side surface 138 to be parallel to the LED PCB 1129*a*. As a result, the LED housing 1300 attached to the LED PCB 1129a has an open side surface and the sealing means is exposed through the open side surface.

For example, each of the two smaller side surfaces may have a thickness of about 0.2 mm and a height of about 0.4 mm, and the top surface may have a thickness of about 0.1 mm. Accordingly, the LED housing may have a height of about 0.5 mm.

A method of fabricating the LED assembly will be illustrated hereinafter. The plurality of first and second lead frames 1129c and 1129d are formed on the LED PCB 1129a and the plurality of LED chips 1129b are formed on the plurality of first lead frames 1129c. The plurality of first lead frames 1129c are electrically connected to the LED PCB 1129a and the plurality of LED chips 1129b. Next, the LED housing 1300 is formed on the LED PCB 1129a to surround the plurality of first and second lead frames 1129c and 1129d and the plurality of LED chips 1129b. Next, the space between the LED PCB 1129a and the LED housing 1300 is filled with the sealing means of the fluorescent material and the resin.

In FIGS. 5C to 5E, a part of a light L of the plurality of LED chips 1129b is emitted directly toward the light guide plate 1123. Another part of the light L of the emitted the plurality of LED chips 1129b is reflected by inner surfaces of the LED housing 1300 to be transmitted toward the light guide plate 1123.

The LED housing 1300 is attached to the LED PCB 1129a through the one open surface in FIGS. 5C to 5E of the first embodiment, while the LED package 129b is attached to the LED PCB 129a through the first sidewall 33 in FIGS. 3A and 3B of the related art. Since the LED housing 1300 is attached to the LED PCB 1129a without a side surface or a sidewall, a thickness of the LED assembly 1129 according to the first embodiment is reduced as compared with the LED assembly 129 according to the related art.

In addition, the plurality of LED chips 1129b are surrounded by the two smaller side surfaces 139 in FIGS. 5C to 5E of the first embodiment, while each of the plurality of LED chips 42 are surrounded by the third and fourth sidewalls 37 and 39 in FIGS. 3A and 3B of the related art. Since the plurality of LED chips 1129b are surrounded by only the two smaller side surfaces 139, the LED assembly 1129 according to the first embodiment has a larger inner space as compared with the LED assembly 129 according to the related art. As the inner space increases, a possibility of the light L from the plurality of LED chips 1129b to the light guide plate 1123 increases. Further, the light L from the plurality of LED chips 1129b may be sufficiently mixed and reflected in the inner space. As a result, deterioration such as hot spot is prevented and uniformity in luminance is improved.

For example, the LED assembly 1129 according to the first embodiment may have an emitting area of about 9.04 mm², while the LED assembly 129 according to the related art may have an emitting area of about 6.8 mm². The emitting area of the first embodiment increases by about 33% as compared with the emitting area of the related art.

In FIGS. 5A to 5E, the two smaller side surfaces 139 and the larger side surface 138 of the LED housing 1300 are attached to the LED PCB 1129a and the LED PCB 1129a is disposed parallel to the light guide plate 1123 so that the open surface of the LED housing can face the light guide plate 1123.

For the purpose of compensating reduction in luminous flux due to increase in distance between the plurality of LED chips 1129b and the side surfaces 138 and 139 of the LED housing 1300, the LED PCB 1129a may have a white color for relatively high reflectance. A reflectance of the LED PCB 1129a of a white color may have higher than a reflectance of the sidewalls through a molding method.

In addition, the LED PCB 1129a may extend toward the light guide plate 1123 to overlap the light guide plate 1123, or the reflecting plate 1125 may extend toward the LED assembly 1129 to overlap the LED assembly 1129. As a result, a light leakage is prevented and reduction in luminous flux is compensated.

Further, for the purpose of compensating light loss due to interference between adjacent LED chips 1129b, a means having reflecting surfaces may be formed between the adjacent LED chips 1129b to increase amount of the light in another embodiment.

In the backlight unit 1120 including a side-view type LED assembly 1129 and the LCD device including the backlight unit 1120, a thickness of the backlight unit 1120 is reduced due to omission of a lower side surface facing the LED PCB 1129a. As a result, the slim backlight unit 1120 and the LCD device of a thin profile are obtained.

Figure 6A:
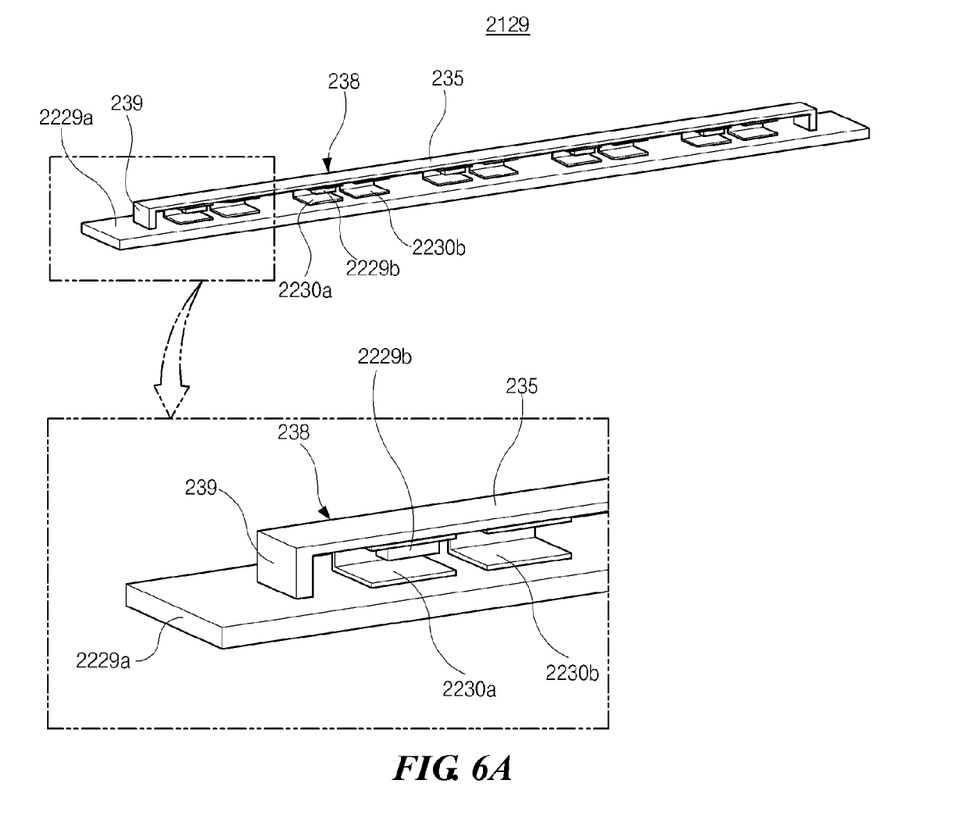
FIG. 6A is a perspective view showing an LED assembly for a liquid crystal display device according to a second embodiment of the present invention.
Figure 6B:
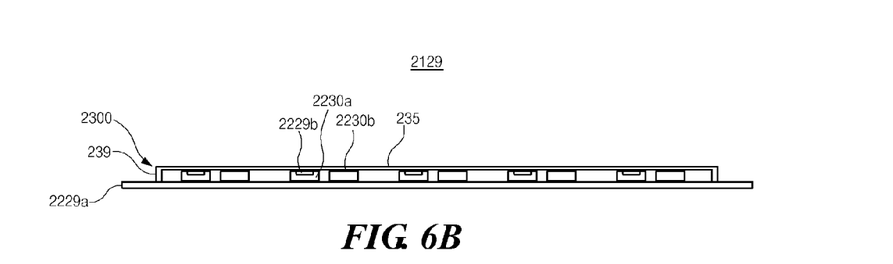
FIG. 6B is a front view showing an LED assembly for a liquid crystal display device according to a second embodiment of the present invention.

FIGS. 6A and 6B are perspective and front views, respectively, showing an LED assembly for a liquid crystal display device according to a second embodiment of the present invention.

Although not shown, similarly to the first embodiment, a liquid crystal display (LCD) device according to the second embodiment includes a liquid crystal panel, a backlight unit, a main frame, a top frame and a bottom frame. The backlight unit for supplying a light is disposed under the liquid crystal panel. The backlight unit may include a light guide plate, a reflecting plate, an optical sheet and a light emitting diode (LED) assembly 2129. The light guide plate is disposed under the liquid crystal panel and the optical sheet is disposed between the liquid crystal panel and the light guide plate.

The LED assembly 2129 is disposed at a side of the light guide plate and supplies a light to the light guide plate. The light emitted from the LED assembly enters the light guide plate and then is uniformly diffused in the light guide plate by total reflection. The light emitted from a top surface of the light guide plate passes through the optical sheet to become a uniform plane light and then is supplied to the liquid crystal panel.

The LED assembly 2129 having a side-view type includes an LED printed circuit board (PCB) 2229a, a plurality of LED chips 2229b over the LED PCB 2229a, a plurality of first lead frames 2230a electrically connecting the LED PCB 2229a and the plurality of LED chips 2229b and an LED housing 2300 surrounding the plurality of LED chips 2229b and the plurality of first lead frames 2230a. The LED PCB 2229a is disposed parallel to the light guide plate. The plurality of LED chips 2229b are mounted on the plurality of first lead frame 2230a, respectively, and each of the plurality of LED chips 2229b emits a light from a side surface thereof. For example, the plurality of LED chips 2229b may be disposed to be separated from each other by an equal distance. Although not shown, a space surrounded by the LED housing 2300 is filled with a sealing means so that the plurality of LED chips 2229b is covered with the sealing means. The sealing means may include a fluorescent material and a resin.

The LED housing 2300 has a rectangular parallelepiped shape including a top surface 235, a larger side surface 238, two smaller side surfaces 239, two open surfaces. In another embodiment, the LED housing 2300 may have a hemispherical shape including an open portion for emission. The two smaller side surfaces 239 are attached to the LED PCB 2229a to support right and left ends of the top surface 235, and the larger side surface 238 is attached to the LED PCB 2229a to support a rear end of the top surface 235. One open surface of the LED housing 2300 faces the LED PCB 2229a and the other open surface of the LED housing 2300 faces the light guide plate. The top surface 235 is attached to the two smaller side surfaces 239 and the larger side surface 238 to be parallel to the LED PCB 2229a. As a result, the LED housing 2300 attached to the LED PCB 2229a has an open side surface and the sealing means is exposed through the open side surface.

Each of the plurality of first lead frames 2230a on an inner surface of the LED housing 2300 may have a U shape in a cross-sectional view. For example, each of the plurality of first lead frames 2230a may have an upper plate corresponding to the top surface 235 of the LED housing 2300, a middle plate corresponding to the larger side surface 238 of the LED housing 2300 and a lower plate corresponding to the LED PCB 2229a.

The plurality of LED chips 2229b are formed on an inner surface of the upper plates of the plurality of first lead frames 2230a and the lower plates of the plurality of first lead frames 2230a are formed on the LED PCB 2229a. The upper plate of each first lead frame 2230a may be spaced apart from the top surface of the LED housing 2300. Accordingly, the plurality of LED chips 2229b are electrically connected to the LED PCB 2229a through the plurality of first lead frames 2230a. Although not shown, each of the plurality of LED chips 2229b may have first and second electrode leads and first and second wires may electrically connect each of the plurality of first lead frames 2230a and each of the plurality of second lead frames 2230b to the first and second electrode leads, respectively.

A plurality of second lead frames 2230b may be formed adjacent to the plurality of first lead frames 2230a on the inner surface of the LED housing 2300. Each of the plurality of second lead frames 2230b may have the same shape as each of the plurality of first lead frames 2230a. For example, a width of each of the plates of each second lead frame 2230b may be equal to or smaller than a width of each of the plates of each first lead frame 2230a. The plurality of second lead frames 2230b may be omitted in another embodiment.

The heat of the plurality of LED chips 2229b may be radiated through the first and second lead frames 2230a and 2230b as well as the LED housing 2300. As a result, deterioration such as discoloration of the LED housing 2300 is prevented and thermal resistance property of the LED housing 2300 is improved, thereby high reliability of the LED housing 2300 in a relatively high temperature obtained.

The first and second lead frames 2230a and 2230b may be treated to have a luster for reflectance. The first and second lead frames 2230a and 2230b having a luster have higher brilliance and reflectance as compared with the first and second lead frames 2230a and 2230b coated with silver (Ag). As a result, luminous flux of the LED assembly 2129 is improved. The reflectance of the first and second lead frames 2230a and 2230b having a luster increases by about 5% to about 7% as compared with the reflectance of the first and second lead frames 2230a and 2230b coated with silver (Ag). For example, the first and second lead frames 2230a and 2230b having a luster may have a reflectance of about 95%, while the first and second lead frames 2230a and 2230b coated with silver (Ag) may have a reflectance of about 90%.

For the purpose of compensating reduction in luminous flux due to increase in distance between the plurality of LED chips 2229b and the side surfaces 238 and 239 of the LED housing 2300, the LED PCB 2229a may have a white color for relatively high reflectance. A reflectance of the LED PCB 2229a of a white color may have higher than a reflectance of the sidewalls through a molding method.

In addition, the LED PCB 2229a may extend toward the light guide plate to overlap the light guide plate, or the reflecting plate may extend toward the LED assembly 2129 to overlap the LED assembly 2129. For example, the reflecting plate may extend to overlap the plurality of LED chips 2229b. As a result, a light leakage is prevented and reduction in luminous flux is compensated.

Further, for the purpose of compensating light loss due to interference between adjacent LED chips 2229b, a means having reflecting surfaces may be formed between the adjacent LED chips 2229b to increase amount of the light in another embodiment.

In the backlight unit including a side-view type LED assembly 2129 and the LCD device including the backlight unit, a thickness of the backlight unit is reduced due to omission of a lower side surface facing the LED PCB 2229a. In addition, an effect of heat radiation is improved due to the first and second lead frames 2230a and 2230b. As a result, the slim backlight unit and the LCD device having a thin profile and a high heat radiation effect are obtained without reduction in luminous flux.

Consequently, in the backlight unit according to the present disclosure, the LED housing surrounding the plurality of LED chips is attached to the LED PCB through an open surface, a bottom surface of the LED housing is omitted and a thickness of the LED assembly and the backlight unit is reduced. In addition, since the plurality of LED chips are disposed between the LED PCB and the LED housing and the space between the LED PCB and the LED housing is filled with the sealing means, the structure of the LED assembly is simplified. Moreover, since the plurality of LED chips are surrounded by the single LED housing, deterioration such as hot spot is prevented and an optical efficiency is improved. Furthermore, since the enlarged lead for connecting the LED PCB and the plurality of LED chips is formed on the inner surface of the LED housing frame, an effect of heat radiation is improved.

It will be apparent to those skilled in the art that various modifications and variations can be made in a backlight unit and a liquid crystal display device including the backlight unit of the present disclosure without departing from the sprit or scope of the invention. Thus, it is intended that the present invention covers the modifications and variations of this invention provided they come within the scope of the appended claims and their equivalents.

What is claimed is:

1. A backlight unit, comprising:
   a light guide plate;
   a light emitting diode (LED) assembly supplying a light to the light guide plate; and
   a reflecting plate under the light guide plate,
   wherein the LED assembly comprises:
      an LED printed circuit board (PCB) disposed at a side of the light guide plate;
      a plurality of LED chips over the LED PCB, the plurality of LED chips spaced apart from each other;
      a plurality of first lead frames electrically connecting the LED PCB and the plurality of LED chips; and
      an LED housing surrounding the plurality of LED chips and the plurality of first lead frames.

2. The backlight unit according to claim 1, wherein the LED housing has a rectangular parallelepiped shape including a top surface, a larger side surface, two smaller side surfaces and two open surfaces.

3. The backlight unit according to claim 2, wherein one of the two open surfaces faces the light guide plate and the other of the two open surfaces corresponds to the LED PCB.

4. The backlight unit according to claim 1, further comprising a sealing means filling a space surrounded by the LED PCB and the LED housing.

5. The backlight unit according to claim 1, wherein each of the plurality of first lead frames has a plate shape.

6. The backlight unit according to claim 2, wherein the plurality of first lead frames are formed on the LED PCB, and the plurality of LED chips are formed on the plurality of first lead frames, respectively.

7. The backlight unit according to claim 1, wherein each of the plurality of first lead frames has a U shape in a cross-sectional view, and each of the plurality of first lead frames has an upper plate corresponding to a top surface of the LED housing, a middle plate corresponding to a larger side surface of the LED housing and a lower plate corresponding to the LED PCB.

8. The backlight unit according to claim 7, wherein the lower plates of the plurality of first lead frames are formed on an inner surface of the LED PCB, and the plurality of LED chips are formed on the upper plates, respectively, of the plurality of first lead frames.

9. The backlight unit according to claim 7, wherein the upper plates of the plurality of first lead frames are spaced apart from a top surface of the LED housing.

10. The backlight unit according to claim 1, further comprising a plurality of second lead frames adjacent to the plurality of first lead frames.

11. The backlight unit according to claim 10, wherein each of the plurality of second lead frames has a same shape as each of the plurality of first lead frames, and wherein a width of each of the plates of each second lead frame may be equal to or smaller than a width of each of the plurality of first lead frames.

12. The backlight unit according to claim 1, wherein the reflecting plate extends to overlap the LED assembly.

13. The backlight unit according to claim 1, wherein the LED PCB extends to overlap the light guide plate.

14. A liquid crystal display device, comprising:
a liquid crystal panel displaying an image;
a backlight unit supplying a light to the liquid crystal panel, wherein the backlight unit includes a light guide plate, a light emitting diode (LED) assembly supplying a light to the light guide plate and a reflecting plate under the light guide plate,
wherein the LED assembly comprises:
an LED printed circuit board (PCB) disposed at a side of the light guide plate;
a plurality of LED chips over the LED PCB, the plurality of LED chips spaced apart from each other;
a plurality of first lead frames electrically connecting the LED PCB and the plurality of LED chips; and
an LED housing surrounding the plurality of LED chips and the plurality of first lead frames;
a main frame wrapping the liquid crystal panel and the backlight unit;
a top frame covering front edge portions of the liquid crystal panel; and
a bottom frame covering a bottom surface of the backlight unit.

* * * * *